(12) United States Patent
Yamamoto

(10) Patent No.: US 7,040,758 B2
(45) Date of Patent: May 9, 2006

(54) SPECTACLE LENS

(75) Inventor: Chikara Yamamoto, Saitama-ken (JP)

(73) Assignee: PENTAX Corporation, Tokyo (JP)

( * ) Notice: Subject to any disclaimer, the term of this patent is extended or adjusted under 35 U.S.C. 154(b) by 0 days.

(21) Appl. No.: 10/658,321

(22) Filed: Sep. 10, 2003

(65) Prior Publication Data
US 2004/0075803 A1 Apr. 22, 2004

(30) Foreign Application Priority Data
Sep. 10, 2002 (JP) ............................ 2002-263831

(51) Int. Cl.
*G02C 7/06* (2006.01)
(52) U.S. Cl. ...................................... 351/169
(58) Field of Classification Search ................ 351/169, 351/168, 170–172, 177
See application file for complete search history.

(56) References Cited

U.S. PATENT DOCUMENTS

| | | | | |
|---|---|---|---|---|
| 2,878,721 A | 3/1959 | Kanolt | ........................ | 351/169 |
| 4,786,160 A | 11/1988 | Fürter | ........................ | 351/169 |
| 4,796,988 A | 1/1989 | Dufour et al. | ............... | 351/169 |
| 5,777,716 A | 7/1998 | Miura | ........................ | 351/169 |
| 5,805,265 A | 9/1998 | Umeda | ........................ | 351/169 |
| 5,864,380 A | 1/1999 | Umeda | ........................ | 351/169 |
| 6,186,627 B1* | 2/2001 | Obara | ........................ | 351/169 |
| 6,318,859 B1* | 11/2001 | Baudart et al. | ............. | 351/169 |
| 6,382,789 B1* | 5/2002 | Baudart et al. | ............. | 351/177 |
| 2004/0008320 A1* | 1/2004 | Shirayanagi | ................ | 351/168 |

FOREIGN PATENT DOCUMENTS

| | | |
|---|---|---|
| GB | 2056106 | 3/1981 |
| JP | 62-30216 | 2/1987 |
| JP | 8-114775 | 5/1996 |
| JP | 9-49991 | 2/1997 |
| JP | 9-251143 | 9/1997 |
| WO | 95/26518 | 10/1995 |
| WO | 97/26579 | 7/1997 |

* cited by examiner

*Primary Examiner*—Jordan M. Schwartz
(74) *Attorney, Agent, or Firm*—Greenblum & Bernstein P.L.C.

(57) ABSTRACT

There is provided a spectacle lens, which includes a central portion that is located at a middle section of the spectacle lens, average transmission power within the central portion being substantially constant, an upper portion that is located on upper side of the central portion, average transmission power within the upper portion changing continuously from a lower end of the upper portion to a top end of the spectacle lens, and a lower portion that is located on lower side of the central portion, average transmission power within the lower portion changing continuously from a top end of the lower portion to a lower end of the spectacle lens.

16 Claims, 5 Drawing Sheets

TRANSMISSION PERFORMANCE

TRANSMISSION PERFORMANCE

TRANSMISSION PERFORMANCE

TRANSMISSION PERFORMANCE

SPECTACLE LENS

BACKGROUND OF THE INVENTION

The present invention relates to a spectacle lens for adjusting eye sight. In particular, the present invention relates to a spectacle lens used for correction of presbyopia.

Conventionally, spectacle lenses for correction of presbyopia such as a unifocal lens, a multifocal lens and a progressive power lens are widely used to compensate for age-related decrease in amplitude of accommodation of eye. Since these spectacle lenses have advantages and drawbacks in comparison with each other, an wearer of the spectacle lenses for correction of presbyopia is required to choose one of the spectacle lenses according to conditions and environments so as to obtain eyesight adapted to object distance that the wearer mainly uses.

As personal computers (PCs) become widespread, operating time of the PCs by elderly persons is becoming greater every year. For this reason, a desire for comfortably viewing an object such as PC's display at a middle distance of about 50 cm is growing.

The unifocal lens refractive power of which is adjusted to the middle distance fits the desire because the unifocal lens is suitable for use at middle distances. However, due to its characteristics, the unifocal lens can be applied to only a shallow range in which accommodation of eyes acts. Therefore, the wearer is required to change the spectacles when the wearer views an object at a long distance or views an object at a short distance. This is very troublesome for the wearer.

Computer operation requires an operator to simultaneously view an object such as a document at the short distance and an object such as a computer screen at the middle distance. Under such a situation, usefulness of the unifocal lens lowers.

Although the multifocal lense can be used for the computer operation (i.e., for simultaneously viewing the object at the short distance and the object at the middle distance), the multifocal lens causes the wearer a sense of discomfort due to jumps of images resulting from discontinuity of the refractive power of the multifocal lens. Furthermore, in a case of the multifocal lens having high addition power, the wearer (wearer's eye) may fail to focus on objects at the middle distance since such multifocal lens is designed to have a relatively great difference in refractive power between a distance portion for distance vision and a near portion for near vision.

To solve the above mentioned problems of the unifocal lens and the multifocal lens, some types of progressive power lenses which are designed to simultaneously view objects at the middle distance and at the short distance have been suggested.

U.S. Pat. No. 4,786,160 (document 1) discloses a spectacle lens which has progressive addition power in its upper portion and lower portion. The spectacle lens of the document 1 further has a central portion which has substantially constant refractive power and which is located between a distance portion and a near portion.

To provide the spectacle lens with three visual distances (i.e., the distance portion for distance vision, the middle portion for middle vision and the near portion for near vision) enables the spectacle lens to be used for a full range of distance (i.e., from the short distance to the long distance). However, in this case, vertical size of each of the distance portion, the middle portion and the near portion becomes smaller. Furthermore, since the spectacle lens is provided with two progressive power portions in addition to the three visual distance portions, a change in refractive power in each progressive power portion becomes sharp. Because the spectacle lens in the document 1 has the same problems as those of the multifocal lens in addition to having a difficulty of machining process, usefulness of the spectacle lens of the document 1 is very low.

In all cases of progressive power lenses disclosed in U.S. Pat. No. 5,805,265 (document 2), U.S. Pat. No. 5,864,380 (document 3) and U.S. Pat. No. 5,777,716 (document 4), an object at middle distance is viewed through a progressive power portion located between a distance portion and a near portion. Since each of spectacle lenses disclosed in the documents 2–4 has great astigmatism within side portions of the progressive power portion (i.e., a central portion), there is a limitation in making a clear vision area wide in the central portion and therefore distortion occurs in the central portion.

In this specification, the clear vision area means an area in which an image can be viewed without distortion or blurring. More specifically, the clear vision area means an area in which astigmatism is less than or equal to 0.5D [Diopter]. Expressions of directions such as "upwards", "downward", "horizontal" and "vertical" indicate directions with reference to a condition during wearing of the spectacle lens.

In general, during the PC operation, a display and a keyboard respectively located at the middle distance and the short distance are alternately viewed at frequent intervals. In a case where the object at the middle distance is viewed through the central portion of the spectacle lens of the documents 2–4, refractive power changes as an angle of the wearer's line of sight changes even if the object distance does not change.

Therefore, the wearer is required to shake his/her head vertically or horizontally so as to find a condition in which an image formed through the progressive power portion is comfortably viewed. Such adjustment makes the wearer tired and therefore work efficiency lowers.

SUMMARY OF THE INVENTION

The present invention is advantageous in that it provides a spectacle lens which has a wide clear vision area suitable mainly for viewing an object at a middle distance and which enables an wearer to view objects without a sense of discomfort even if a line of sight is changed from the object at the middle distance to an object at a short or long distance.

According to an aspect of the invention, there is provided a spectacle lens, which includes a central portion that is located at a middle section of the spectacle lens, average transmission power within the central portion being substantially constant, an upper portion that is located on upper side of the central portion, average transmission power within the upper portion changing continuously from a lower end of the upper portion to a top end of the spectacle lens, and a lower portion that is located on lower side of the central portion, average transmission power within the lower portion changing continuously from a top end of the lower portion to a lower end of the spectacle lens.

Since the spectacle lens has the central portion having the constant average transmission power, the spectacle lens is suitable for use in viewing an object at a middle distance for a long time. Further, in each of the upper portion and the lower portion, average transmission power changes continuously from central portion to a top end or a bottom end of the lens. Therefore, the wearer can view objects without a sense of discomfort when the wearer vertically moves his/her eyes. Thus, a burden of eyes of the wearer can be reduced.

As described above, the lens shown in the document 1 requires three visual distance portions each of which has a certain size in the vertical direction. Therefore, if the lens of the document 1 is configured to be short in vertical size, a change in refractive power within progressive power portion becomes too sharp. Such a sharp change of the refractive power places a burden on the wearer (wearer's eyes), and such a design is not desirable. On the other hand, the spectacle lens according to the invention has only one portion as a visual distance portion within which refractive power is constant, so that a vertical size of the spectacle lens can be shortened. Therefore, the spectacle lens according to the invention fits with a spectacle lens frame whose vertical size is narrow. Thereby, a desirable design of the spectacle lens can be accomplished.

Furthermore, with the above configuration of the invention, a fitting point can be placed within the central portion, work for fitting the lens into the spectacle lens frame can be eased.

Optionally, the spectacle lens may include a clear vision area whose horizontal size is configured to be the greatest in the central portion.

Still optionally, the spectacle lens may include a clear vision area whose horizontal size is configured to be the greatest in the central portion. In this case, the horizontal size of the clear vision area on a point on the lens initially decreases and then increases as the point proceeds downward or upward from the central portion.

In a particular case, the central portion may be configured to be a middle portion for a middle vision.

In general, objects viewed during the PC operation are often located at the middle distance. For this reason, the central portion of the spectacle lens is configured to be the middle portion for the middle vision. That is, the central portion is configured to have dipotric power required for viewing the object at the middle distance. Thereby, the spectacle lens suitable for mainly viewing the object at the middle distance can be accomplished.

In the case of the spectacle lens of the document 1 having three visual distances, it is required to measure three pieces of dioptric power for the distance portion, the middle portion and the near portion. On the other hand, according to the spectacle lens of the invention, only the dioptric power for the middle vision is required to measure.

In a particular case, the spectacle lens may satisfy a condition:

$$6 \text{ mm} \leq W \leq 15 \text{ mm} \tag{1}$$

where W (mm) represents a size of the central portion in a vertical direction.

If W decreases under a lower limitation of the conditions (1), the vertical size of the central portion becomes too small. In this case, an area in which objects at the middle distance can be stably viewed becomes narrow. If W exceeds the upper limit of the condition (1), a change in refractive power within each of the upper portion and the lower portion becomes to sharp. This is not desirable.

Optionally, the spectacle lens may satisfy a condition:

$$8 \text{ mm} \leq W \leq 15 \text{ mm}. \tag{2}$$

Still optionally, the average transmission power within the upper portion continuously may decrease from the lower end of the upper portion to the top end of the spectacle lens, and the average transmission power within the lower portion continuously may increase from the top end of the lower portion to the lower end of the spectacle lens.

In daily life, the wearer views an object at the long distance through the upper portion more often than the central portion. In addition, the wearer views an object at the near distance through the lower portion more often than the central portion. In this regard, the spectacle lens has the above mentioned configuration. Therefore, for example in the PC operation, the wearer can view easily an object at the short distance by moving his/her eye downward, and can view easily an object at the long distance by moving his/her ere upward.

In a particular case, the spectacle lens may be configured such that distribution of aberration is asymmetrical with respect to main meridian. Thereby, distortion of images due to variation in aberration can be prevented when the wearer moves his/her eyes horizontally.

In a particular case, the central portion, the upper portion and the lower portion may be formed on a surface of the spectacle lens, and the surface may be configured to have a non-umbilical region along main meridian. With this configuration, it becomes possible to reduce thickness and weight of the spectacle lens by shortening the depth of a base curve of the spectacle lens.

In a particular case, a form of the surface within the upper portion and the lower portion may be changed according to dioptric power in the vicinity of a center of the spectacle lens so as to provide changes of the average transmission power within the upper portion and the lower portion. With this configuration, it becomes possible to reduce variations of the average transmission power by the dioptric power in the vicinity of the center of the spectacle lens.

Preferably, the dioptric power in the vicinity of a center of the spectacle lens may be negative. In this case, at least at a point of interest along the main meridian within the upper portion, surface power in a direction parallel to the main meridian is greater than surface power in a direction perpendicular to the main meridian. Alternatively, the dioptric power in the vicinity of a center of the spectacle lens may be positive. In this case, at least at a point of interest along the main meridian within the lower portion, surface power in a direction parallel to the main meridian is less than surface power in a direction perpendicular to the main meridian. With these configurations, astigmatism as a performance along the main meridian can be sufficiently reduced.

In this specification, surface power of a cross section parallel to the main mridian means surface power at a point of interest in a direction of a cross section including a vector tangential to the main meridian and a normal vector normal to the lens surface. Further, surface power of a cross section perpendicular to the main meridian means surface power at a point of interest in a direction of a cross section which is perpendicular to a vector tangential to the main meridian.

In a particular case, the spectacle lens may satisfies a condition:

$$P1(14) > P2(14)$$

where $P1(14)$ represents the surface power in a direction parallel to the main meridian at the point of interest which is shifted upward by 14 mm from a center position of the central portion in vertical direction, and $P2(14)$ represents the surface power in a direction perpendicular to the main meridian at the point of interest which is shifted upward by 14 mm from the center position of the central portion in vertical direction.

In the case where the dioptric power in the vicinity of the center of the spectacle lens is negative, a difference between the surface power P1 and the surface power P2 becomes pronouns at the point of interest which is shifted upward by 14 mm from the center position. Therefore, a comparison of the surface power P1 and the surface power P2 can be easily made.

In a particular case, the spectacle lens may satisfy a condition:

$$P1(-14) < P2(-14)$$

where $P1(-14)$ represents the surface power in a direction parallel to the main meridian at the point of interest which is shifted downward by 14 mm from a center position of the central portion in vertical direction, and $P2(-14)$ represents the surface power in a direction perpendicular to the main meridian at the point of interest which is shifted downward by 14 mm from the center position of the central portion in vertical direction.

In the case where the dioptric power in the vicinity of the center of the spectacle lens is positive, a difference between the surface power P1 and the surface power P2 becomes pronouns at the point of interest which is shifted downward by 14 mm from the center position. Therefore, a comparison of the surface power P1 and the surface power P2 can be easily made.

In a particular case, a form of a back surface of the spectacle lens may be changed according to a position on the back surface of the spectacle lens so as to provide changes of average transmission power of the spectacle lens. With this configuration, processing of the spectacle lens can be made easier. This configuration is advantageous in that swinging and distortion of images can be suppressed in comparison with a case where a form of a front surface of the spectacle lens is changed.

BRIEF DESCRIPTION OF THE ACCOMPANYING DRAWINGS

DETAILED DESCRIPTION OF THE EMBODIMENTS

Hereinafter, an embodiment according to the invention will be described with reference to the accompanying drawings.

Figure 2:
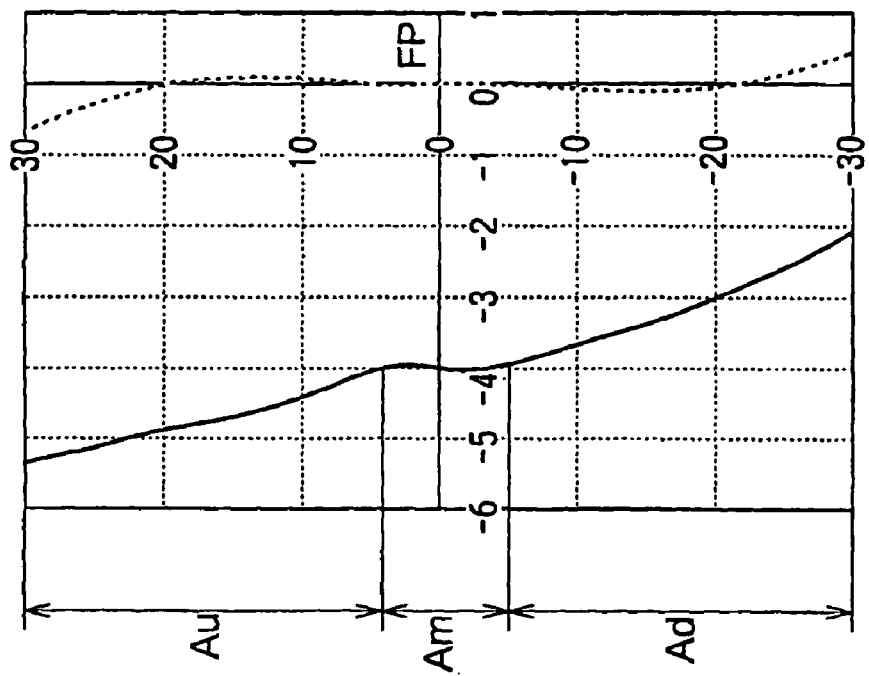
FIG. 2 is a graph illustrating transmission performance of the spectacle lens according to the embodiment of the invention along its main meridian when dioptric power in the central portion is negative.
Figure 1:
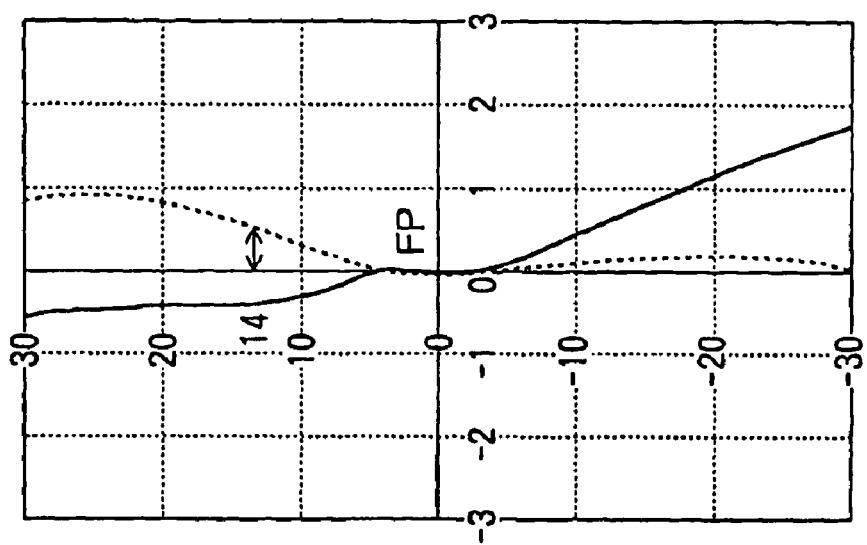
FIG. 1 is a graph illustrating surface performance of a spectacle lens according to an embodiment of the invention along its main meridian when dioptric power in a central portion is negative.

FIGS. 1 and 2 are graphs respectively illustrating surface performance and transmission performance of a spectacle lens according to an embodiment of the invention along its main meridian when dioptric power in a central portion is negative. The lens shown in each of FIGS. 1 and 2 has negative average transmission power (spherical power; SPH) of −4.00[D] within its central portion.

Figure 4:
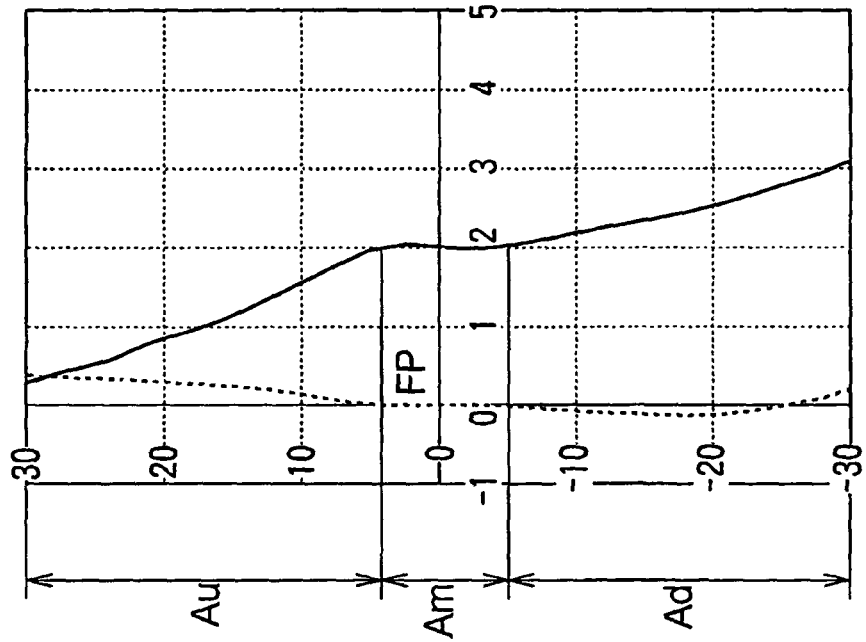
FIG. 4 is a graph illustrating transmission performance of the spectacle lens according to the embodiment of the invention along its main meridian when dioptric power in the central portion is positive.
Figure 3:
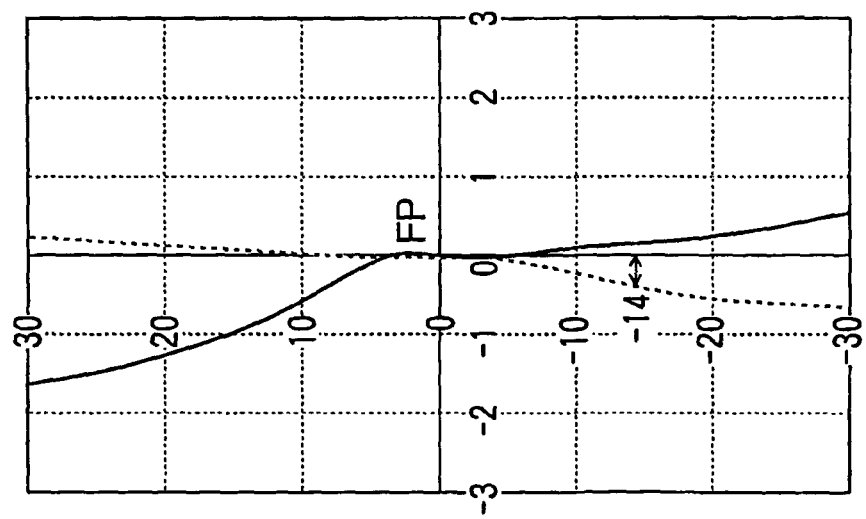
FIG. 3 is a graph illustrating surface performance of the spectacle lens according to the embodiment of the invention along its main meridian when dioptric power in the central portion is positive.

FIGS. 3 and 4 are graphs respectively illustrating surface performance and transmission performance of a spectacle lens according to the embodiment of the invention along its main meridian when dioptric power in the central portion is positive. The lens shown in each of FIGS. 3 and 4 has positive average transmission power (spherical power; SPH) of +2.00[D] within its central portion.

In each of FIGS. 1–4, a solid line represents a change in average refractive power and a dashed line represents a change in astigmatism. In each of FIGS. 1–4, a horizontal axis represents the average refractive power (or astigmatism) (unit: D) and a vertical axis represents a distance (unit: mm) from a center point of the main meridian.

To achieve transmission performance common to FIGS. 2 and 4, the spectacle lens according to the embodiment has a back surface (an eye side surface) which changes like the graphs shown in FIGS. 1 and 3. More specifically, on a back surface the spectacle lens, an area Am (i.e., a central portion) having constant refractive power is provided. The area Am is an area through which an object at the middle distance is viewed. That is, the area Am (i.e., the central portion) corresponds to a progressive power portion of a certain type of conventional progressive power lens.

On an upper area of the spectacle lens, an area Au (i.e., an upper portion) in which average transmission power varies continuously to an upper end of the spectacle lens is provided. On a lower area of the spectacle lens, an area Ad (i.e., a lower portion) in which average transmission power varies continuously to a lower end of the spectacle lens is provided.

As shown by the dashed line in FIGS. 1 and 3, the spectacle lens according to the embodiment is configured to have a non-umbilical region on its surface along the main meridian so that thickness and weight of the spectacle lens can be reduced by shortening the depth of a base curve of the lens. In this specification, the term "non-umbilical" means a condition where surface astigmatism along the main meridian is not zero.

The spectacle lens according to the embodiment is processed so that the back surface has the above mentioned three areas Am, Au and Ad. To process a back surface of a spectacle lens is advantageous in that swinging and distortion of an image can be reduced in comparison with the case in which a front surface of the spectacle lens is processed. More specifically, the spectacle lens according to the embodiment is processed to change refractive power in accordance with dioptric power of the central portion.

For example, as shown by the solid line in FIG. 1, the spectacle lens having negative dioptric power in its central portion is processed so that average surface power increases as a coordinate along the vertical axis proceeds downward from the central portion. An upper portion of the lens is processed so that average refractive power within the upper portion changes (i.e. reduces) at a smaller gradient in comparison with the lower area.

As shown by the solid line in FIG. 3, the spectacle lens having the positive dioptric power in its central portion is processed so that average surface power decreases as a coordinate along the vertical axis proceeds upward from the central portion having constant refractive power. The lower portion of the lens is processed so that average refractive power within the lower portion increases at a smaller gradient in comparison with the upper portion.

By changing the surface forms of the upper portion and the lower portion along the main meridian as described above, refractive power substantially equal to the graphs shown by the solid lines in FIGS. 2 and 4 can be accomplished even if refractive power within the central portions are different from each other.

The spectacle lens having negative average transmission power (dioptric power) in its central portion is processed such that, at least at a point of interest along the main meridian within the upper portion, surface power (first surface power) P1 of a cross section parallel to the main meridian is greater than surface power (second surface power) P2 of a cross section perpendicular to the main meridian.

In the case of the spectacle lens having negative average transmission power in its central portion, in order to ease a comparison between the surface power P1 and the surface power P2, the point of interest is assumed to be a point shifted upward by 14 mm from a point FP located at a center in vertical direction within the area Am.

In this case, the spectacle lens having negative average transmission power in its central portion is configured to satisfy a condition:

$$P1(14) > P2(14) \tag{3}$$

where P1(14) represents the first surface power at the point of interest and P2(14) represents the second surface power at the point of interest. By satisfying the condition (3), transmission astigmatism can be reduced in the spectacle lens having negative average transmission power in its central portion.

The condition (3) can be transformed to the following expression:

$$AS(14) = P1(14) - P2(14) > 0$$

where AS(14) represents astigmatism at a point shifted upward by 14 mm from the center point FP.

As shown in FIG. 1, the spectacle lens having negative average transmission power in its central portion is configured such that AS(14) takes positive values (i.e., the condition (3) can be satisfied). Therefore, as shown by the dashed line in FIG. 2, transmission astigmatism of the spectacle lens is sufficiently reduced at any position along the main meridian.

The spectacle lens having positive average transmission power (dioptric power) at its central portion is configured such that the first surface power P1 is less than the second surface power P2. In the case of the spectacle lens having positive refractive power at its central portion, a point of interest is assumed to be a point shifted downward by 14 mm from the point FP located at a center in vertical direction within the area Am.

In this case, the spectacle lens having positive average transmission power in its central portion is configured to satisfy a condition:

$$P1(-14) > P2(-14) \tag{4}$$

where P1(−14) represents the first surface power at the point of interest and P2(−14) represents the second surface power at the point of interest. By satisfying the condition (4), transmission astigmatism in the spectacle lens having positive average transmission power in its central portion can be reduced.

As shown in FIG. 3, the spectacle lens having positive average transmission power in its central portion is configured such that AS(−14) takes values less than zero (i.e., the condition (4) can be satisfied). Therefore, as shown by the dashed line in FIG. 4, transmission astigmatism of the spectacle lens is sufficiently reduced at any position along the main meridian.

As described above, by processing the surface in accordance with the dioptric power in its central portion, the spectacle lens having average transmission power which changes according to dioptric power in its central portion can be accomplished. That is, the spectacle lens having above mentioned three areas Au, Am and Ad can be accomplished.

Hereinafter, two examples which satisfy the above mentioned conditions will be described in detail.

FIRST EXAMPLE

Figure 5:
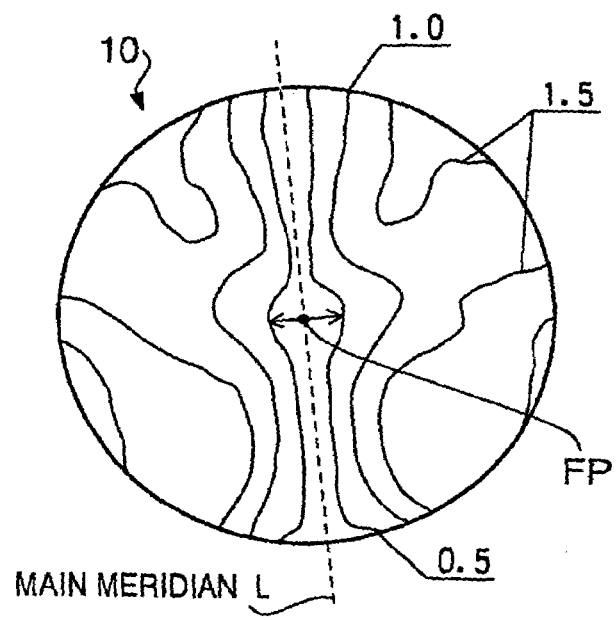
FIG. 5 shows contour lines of transmission astigmatism of a spectacle lens according to a first example.
Figure 6:
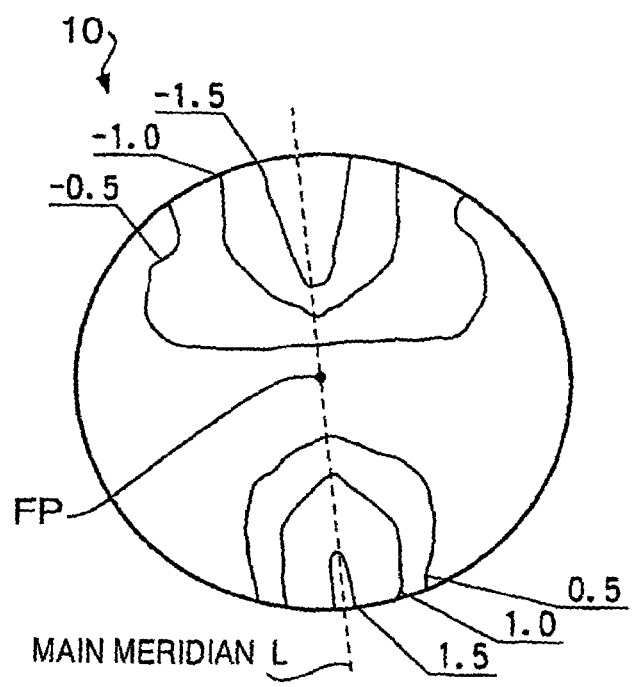
FIG. 6 shows contour lines of average transmission power of the spectacle lens according to the first example.

FIG. 5 shows contour lines (distributions of equivalent amount of astigmatism) of transmission astigmatism of a spectacle lens 10 according to a first example. FIG. 6 shows contour lines of average transmission power (distribution of equivalent amount of average transmission power) of the spectacle lens 10.

In each of FIGS. 5 and 6 (FIGS. 8 and 9), a line L is the main meridian and a point FP along the main meridian is a center point in vertical direction within a central portion having constant refractive power. In this example, the point FP coincides with a center of an outside shape of the lens 10. Each interval between adjacent contour lines corresponds to 0.5 [D].

Figure 7:
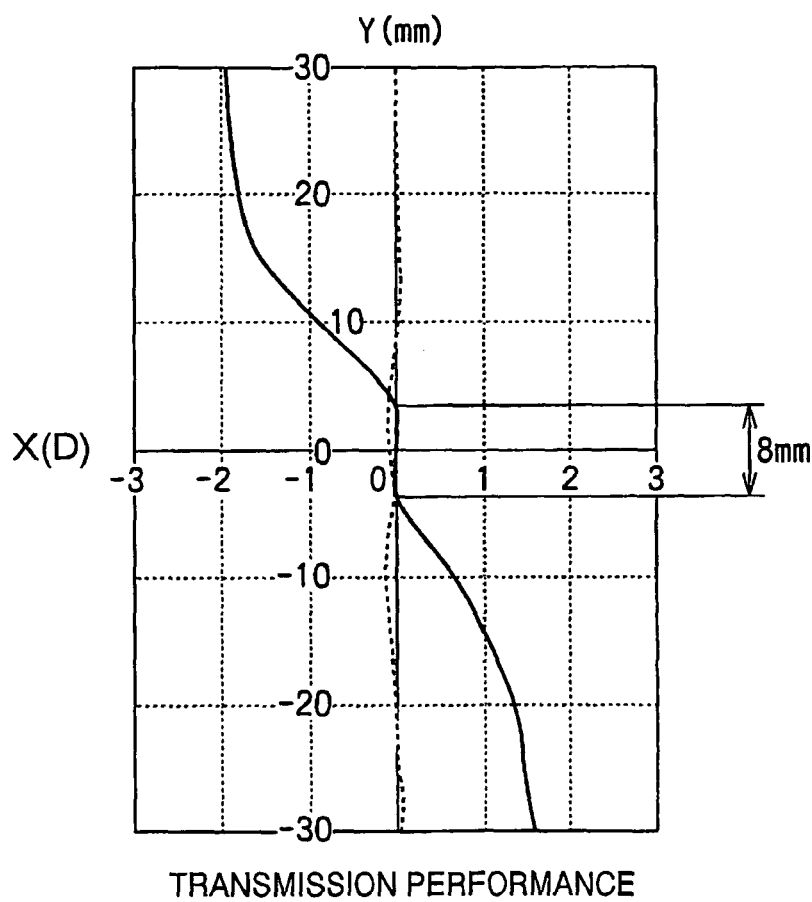
FIG. 7 is a graph showing transmission performance of the spectacle lens according to the first example along the main meridian.

FIG. 7 is a graph showing transmission performance of the spectacle lens 10 along the main meridian L. In FIG. 7 (FIG. 10), a solid line indicates average transmission power and a dashed line indicates transmission astigmatism. In FIG. 7 (FIG. 10), a horizontal axis represents an amount (unit: D) of average transmission power (or transmission astigmatism), and a vertical axis represents a distance (unit: mm) from the center (the point FP) of the outside shape of the lens 10.

The spectacle lens 10 has central dioptric power (SPH) of 0.00D and has a diameter of Φ 75 mm. As shown in FIG. 5, distribution of astigmatism is asymmetrical with respect to the main meridian, which counterbalances distortion in the horizontal direction when the wearer moves his/her eye in the horizontal direction during wearing of the spectacle lens.

The spectacle lens 10 is configured to have the non-umbilical region on its surface along the main meridian. Thereby, astigmatism as the transmission performance is reduced sufficiently as shown by the dashed line in FIG. 7.

As shown in FIGS. 5 and 6, a horizontal size of a clear vision area is designed to be the greatest in the central portion having the constant refractive power. More specifically, as shown by a double-headed arrow in FIG. 5, the horizontal size of the clear vision area is the greatest at the point FP. The horizontal size of the clear vision area reduces initially and then increases again as a coordinate (i.e., a point on the lens) proceeds downward or upward from the central portion including the point FP.

As shown in FIG. 7, a vertical size of the central portion having the constant refractive power is 8 mm. That is, the central portion having the constant refractive power satisfies the condition (1) (i.e., 6 mm≦W≦15 mm) and the condition (2) (i.e., 8 mm≦W≦15 mm) and has a sufficient vertical size for viewing the object at the middle distance. Further, the spectacle lens 10 has an upper portion in which average transmission power continuously decreases as the distance from the central portion increases and has a lower portion in which average transmission power continuously increases as the distance from the central portion increases.

As described above, the spectacle lens 10 has the central portion having constant refractive power and is configured such that the clear vision area has the greatest width in the central portion having the constant refractive power. Therefore, the spectacle lens 10 is suitable for use in a condition where the object at the middle distance is frequently viewed (for example, during the PC operation).

In addition, the spectacle lens 10 has the upper portion and the lower portion each of which has the refractive power which mildly changes from the central portion to an end portion of the spectacle lens 10. Thereby, a burden on the wearer's eyes when the wearer vertically moves his/her eyes can be reduced. Consequently, eyestrain caused, for example, by the PC operation, can be reduced.

SECOND EXAMPLE

Figure 8:
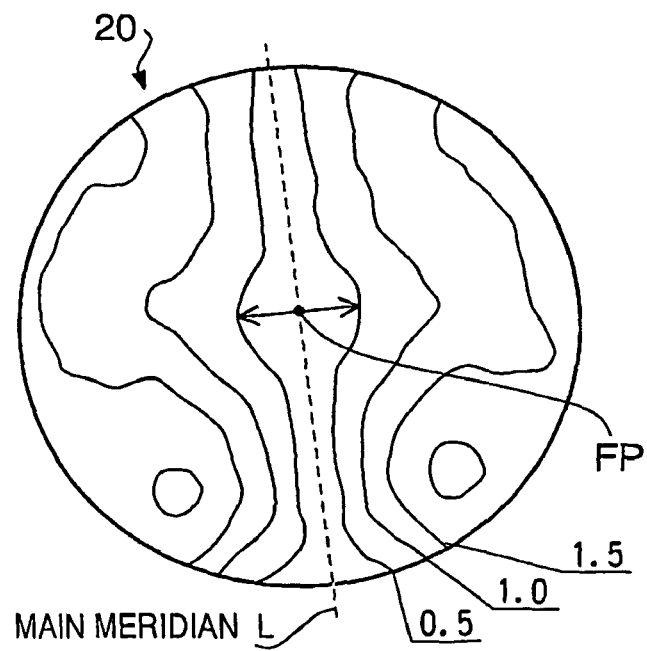
FIG. 8 shows contour lines of transmission astigmatism of a spectacle lens according to a second example.
Figure 9:
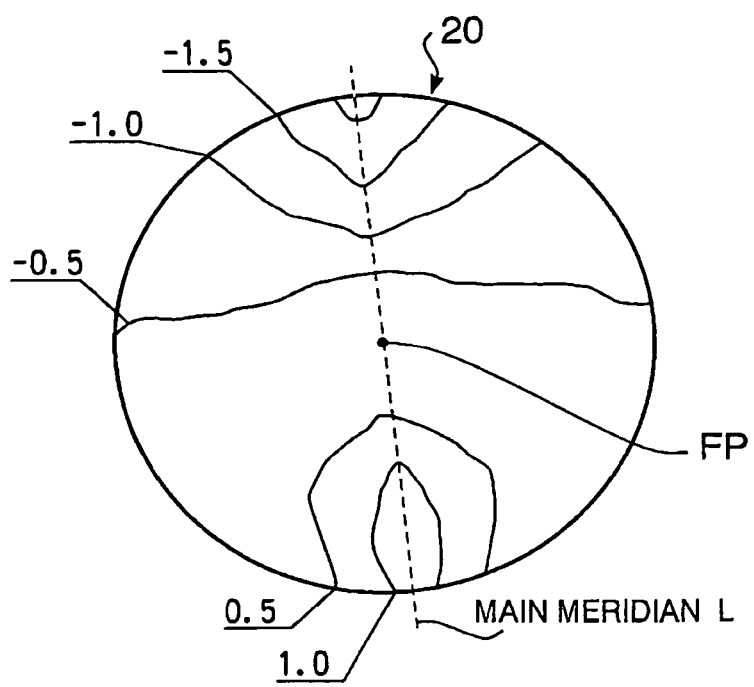
FIG. 9 shows contour lines of average transmission power of the spectacle lens according to the second example.

FIG. 8 shows contour lines (distributions of equivalent amount of astigmatism) of transmission astigmatism of a spectacle lens 20 according to a second example. FIG. 9 shows contour lines of average transmission power (distribution of equivalent amount of average transmission power) of the spectacle lens 20.

Figure 10:
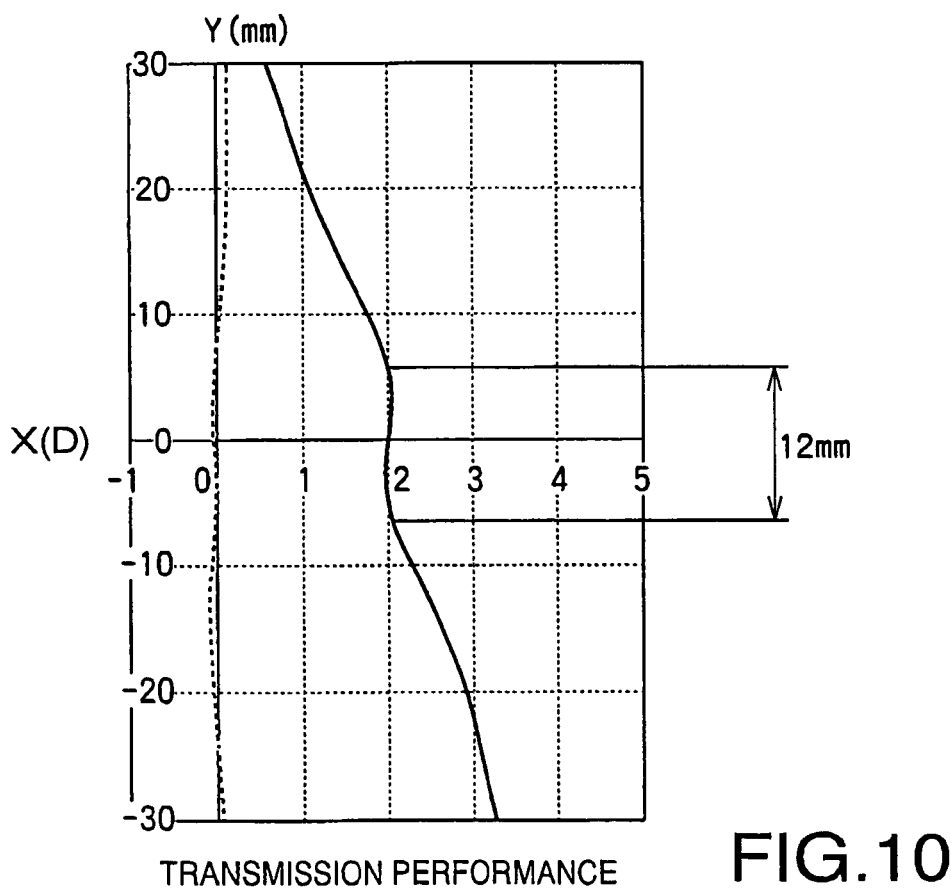
FIG. 10 is a graph showing transmission performance of the spectacle lens according to the second example along main meridian.

FIG. 10 is a graph showing transmission performance of the spectacle lens 20 along main meridian L. In FIG. 10, a solid line indicates average transmission power and a dashed line indicates transmission astigmatism.

The spectacle lens 20 has central dioptric power (SPH) of +2.00D and has a diameter of Φ 85 mm. As shown in FIG. 10, a vertical size of the central portion having the constant refractive power is 12 mm. That is, the central portion having the constant refractive power satisfies the conditions (1) and (2) and has a sufficient vertical size for viewing the object at the middle distance.

As shown in FIG. 8, the spectacle lens 20 is configured to have distribution of astigmatism which is asymmetrical with respect to the main meridian L and is configured to have the non-umbilical region on its surface along the main meridian L. Thereby, astigmatism as the transmission performance is reduced sufficiently as shown by the dashed line in FIG. 10.

As shown in FIG. 8, a horizontal size of a clear vision area is designed to be the greatest in the central portion having the constant refractive power. More specifically, as shown by a double-headed arrow in FIG. 8, the horizontal size of the clear vision area is the greatest at the point FP. The horizontal size of the clear vision area decreases initially and then increases again as a coordinate proceeds downward or upward from the central portion including the point FP.

Similarly to the spectacle lens 10 according to the first example, the spectacle lens 20 has an upper portion in which average transmission power continuously decreases as the distance from the central portion increases and has a lower portion in which average transmission power continuously increases as the distance from the central portion increases.

The spectacle lens 20 has the same advantages as the spectacle lens 10 according to the first example. Furthermore, the vertical size of the central portion having constant refractive power of the spectacle lens 20 is greater than that of the spectacle lens 10 of the first example. Therefore, the spectacle lens 20 is more suitable for use in the condition where the object at the middle distance is frequently viewed (for example, during the PC operation).

Although the present invention has been described in considerable detail with reference to certain preferred embodiment thereof, other embodiments are possible.

For example, although in the above embodiment the backs surface of the spectacle lens is processed so as to have the above mentioned average transmission power, a spectacle lens having a front surface which is processed to have the average transmission power shown in the above mentioned embodiment can be accomplished. Alternatively, both of the front surface and the back surface of a lens may be processed to have the average transmission power shown in the above mentioned embodiment.

The present disclosure relates to the subject matter contained in Japanese Patent Application No. P2002-263831, filed on Sep. 10, 2002, which is expressly incorporated herein by reference in its entirety.

What is claimed is:

1. A spectacle lens, comprising:
a central portion that is located at a middle section of said spectacle lens, average transmission power within said central portion being substantially constant;
a clear vision area whose horizontal size is configured to be the greatest in said central portion;
an upper portion that is located on upper side of said central portion, average transmission power within said upper portion changing continuously from a lower end of said upper portion to a top end of said spectacle lens; and
a lower portion that is located on lower side of said central portion, average transmission power within said lower portion changing continuously from a top end of said lower portion to a lower end of said spectacle lens.

2. The spectacle lens according to claim 1, wherein the horizontal size of said clear vision area on a point on said lens initially decreases and then increases as the point proceeds downward or upward from said central portion.

3. The spectacle lens according to claim 1, wherein said central portion is configured to be a middle portion for a middle vision.

4. The spectacle lens according to claim 1, wherein said spectacle lens satisfies a condition:

6 mm≦W≦15 mm where W in mm represents a size of said central portion in a vertical direction.

5. The spectacle lens according to claim 4, wherein said spectacle lens satisfies a condition:

8 mm≦W≦15 mm.

6. The spectacle lens according to claim 1,
wherein the average transmission power within said upper portion continuously decreases from the lower end of said upper portion to the top end of said spectacle lens;
wherein the average transmission power within said lower portion continuously increases from the top end of said lower portion to the lower end of said spectacle lens.

7. The spectacle lens according to claim 1, wherein said spectacle lens is configured such that distribution of aberration is asymmetrical with respect to main meridian.

8. The spectacle lens according to claim 1,
wherein said central portion, said upper portion and said lower portion are formed on a surface of said spectacle lens;
wherein said surface is configured to have a non-umbilical region along main meridian.

9. The spectacle lens according to claim 8,
wherein a form of said surface within said upper portion and said lower portion is changed according to dioptric power in the vicinity of a center of said spectacle lens so as to provide changes of the average transmission power within said upper portion and said lower portion.

10. The spectacle lens according to claim 8,
wherein the dioptric power in the vicinity of a center of said spectacle lens is negative,
wherein at least at a point of interest along the main meridian within the upper portion, surface power in a direction parallel to the main meridian is greater than surface power in a direction perpendicular to the main meridian.

11. The spectacle lens according to claim 10,
wherein said spectacle lens satisfies a condition:

$$P1(14)>P2(14)$$

where $P1(14)$ represents the surface power of the cross section parallel to the main meridian at the point of interest which is shifted upward by 14 mm from a center position of said central portion in vertical direction, and $P2(14)$ represents the surface power of the cross section perpendicular to the main meridian at the point of interest which is shifted upward by 14 mm from the center position of said central portion in vertical direction.

12. The spectacle lens according to claim 8,
wherein the dioptric power in the vicinity of a center of said spectacle lens is positive,
wherein at least at a point of interest along the main meridian within said lower portion, surface power in a direction parallel to the main meridian is less than surface power in a direction perpendicular to the main meridian.

13. The spectacle lens according to claim 12,
wherein said spectacle lens, satisfies a condition:

$$P1(-14)>P2(-14)$$

where $P1(-14)$ represents the surface power of the cross section parallel to the main meridian at the point of interest which is shifted downward by 14 mm from a center position of said central portion in vertical direction, and $P2(-14)$ represents the surface power of the cross section perpendicular to the main meridian at the point of interest which is shifted downward by 14 mm from the center position of said central portion in vertical direction.

14. The spectacle lens according to claim 1,
wherein a form of a back surface of said spectacle lens is changed according to a position on the back surface of said spectacle lens so as to provide changes of average transmission power of said spectacle lens.

15. A spectacle lens, comprising:
a central portion that is located at a middle section of said spectacle lens, average transmission power within said central portion being substantially constant;
an upper portion that is located on upper side of said central portion, average transmission power within said upper portion changing continuously from a lower end of said upper portion to a top end of said spectacle lens;
a lower portion that is located on lower side of said central portion, average transmission power within said lower portion changing continuously from a top end of said lower portion to a lower end of said spectacle lens; and
a clear vision area having a horizontal size configured to be the greatest in said central portion, wherein the horizontal size of said clear vision area on a point on said lens initially decreases and then increases as the point proceeds downward or upward from said central portion.

16. A spectacle lens, comprising:
a central portion that is located at a middle section of said spectacle lens, average transmission power within said central portion being substantially constant;
an upper portion that is located on upper side of said central portion, average transmission power within said upper portion changing continuously from a lower end of said upper portion to a top end of said spectacle lens; and
a lower portion that is located on lower side of said central portion, average transmission power within said lower portion changing continuously from a top end of said lower portion to a lower end of said spectacle lens;
wherein the average transmission power within said upper portion continuously decreases from the lower end of said upper portion to the top end of said spectacle lens; and
wherein the average transmission power within said lower portion continuously increases from the top end of said lower portion to the lower end of said spectacle lens.

* * * * *